Feb. 13, 1962            E. S. JOLINE            3,020,764
PRESSURE RATIO MEASURING DEVICE
Filed Jan. 6, 1960
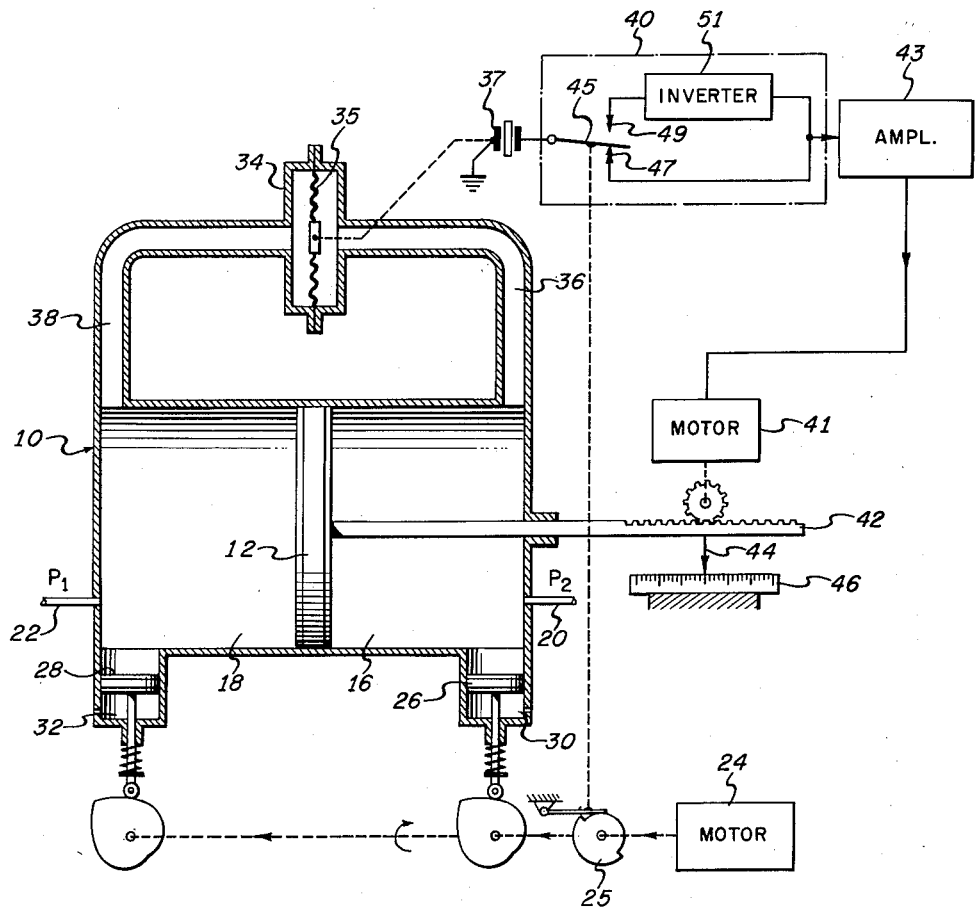
INVENTOR
EVERETT S. JOLINE
BY
ATTORNEY

United States Patent Office 3,020,764
Patented Feb. 13, 1962

3,020,764
PRESSURE RATIO MEASURING DEVICE
Everett S. Joline, Huntington Station, N.Y., assignor to Sperry Rand Corporation, Great Neck, N.Y., a corporation of Delaware
Filed Jan. 6, 1960, Ser. No. 838
6 Claims. (Cl. 73—398)

This invention relates generally to pressure measuring apparatus and more particularly to apparatus which, having two separate sources of gas pressure connected to it, measures the ratio of the gas pressure of one of the sources to the gas pressure of the other.

The present invention is based on the fact that when two separate sources of gas are connected to respective chambers which have their volumes cyclically varied, the ratio of the pressure of one source to the pressure of the other source will be proportional to the ratio of the quiescent volume of one chamber to the quiescent volume of the chamber if the following conditions are met: (1) the gas from each source is prevented from escaping into or out of the chamber to which it is connected as a result of cyclical changes in the volume of that chamber; and (2) the cyclical variations in the gas pressures within the chambers, which result from cyclical variations in the volumes of the chambers, are equalized by adjusting the quiescent volumes of the chambers.

A typical embodiment of the invention has the separate sources of gas pressure connected to a cylinder, respectively on opposite sides of a piston contained within the cylinder, and includes means to cyclically vary the volumes on each side of the piston. A transducer responds to differences in the cyclical variations in the pressures on opposite sides of the piston and produces a signal whenever a cyclical differential pressure exists. The signal from the transducer then drives a motor to position the piston so that no cyclical differential pressure is present. When there is no cyclical differential pressure, the ratio of the quiescent volumes on opposite sides of the piston is proportional to the ratio of the pressures of the two gases connected to the cylinder.

Whereas apparatus embodying the present invention directly measures pressure ratios, prior art apparatus for measuring pressure ratios usually require that the pressures, whose ratio is to be determined, exert forces on a device which operates to produce the ratio of those forces: the ratio of the forces being equal to the pressure ratio. One such force-ratio measuring device usable in this manner is disclosed in U.S. Patent 2,557,092 issued in the name of R. F. Garbarini and assigned to the assignee of the present invention.

A prime object of the invention is to provide apparatus which directly measures the ratio of the gas pressure of one source to the gas pressure of another source.

Another object of the invention is to provide apparatus which does not require the use of a force-ratio measuring device to measure pressure ratios.

The invention will be described with reference to the accompanying drawing; wherein The single figure is a schematic diagram of a presently preferred embodiment of the present invention.

Referring to the figure, a piston 12 is contained within a cylinder 10 and separates the cylinder chambers 16 and 18 from each other. Two separate sources of gas pressure are connected respectively to the chambers 16 and 18 via capillary tubes 20 and 22. A motor 24 drives pistons 26 and 28 which are contained respectively in auxiliary cylinders 30 and 32. The pistons 26 and 28 are driven in like manner and simultaneously decrease the volumes of the chambers 16 and 18 when they are moved up; correspondingly, when the pistons 26 and 28 are moved down, the volumes of the chambers 16 and 18 are increased simultaneously. In this form of the invention, the auxiliary cylinders have equal volumes, and the cyclical variations of the volumes of the chambers 16 and 18 are the same. The cyclic frequency and overall dimensions of the device are chosen so that the wavelength of the pressure perturbations is greater than the dimensions. This insures that the gas is in static equilibrium at all points in the movement of pistons 26 and 28. As the volumes of the chambers 16 and 18 are increased simultaneously, the gas pressures in those chambers are decreased simultaneously; as the volumes of the chambers 16 and 18 are decreased simultaneously, the gas pressures in those chambers are increased simultaneously. This is because the capillary tubes 20 and 22 allow virtually no flow of gas into or out of the chambers 16 and 18 during a single cycle of the pistons 26 and 28. A pressure differential pickup 34, coupled respectively to the chambers 16 and 18 by conduits 36 and 38, senses changes in the difference between the pressure within chamber 16 and the pressure within chamber 18. The pickup 34, in this embodiment of the invention, has a diaphragm 35, the faces of which are respectively in association with the gas contained in chambers 16 and 18. A piezoelectric crystal 37 responds to fluctuations of the diaphragm 35, and produces A.C. output signals representing the fluctuation of the diaphragm 35. The output signals from the crystal 37 are then applied to a demodulator 40. The demodulator 40 is provided with an input switch 45 and an inverter 51. The cam 25 is coupled to and alternately moves the switch 45 between contacts 47 and 49 at the same frequency that the pistons 26 and 28 are cyclically moved. The inverter 51 has the signal on contact 49 applied to its input and has its output signal applied to a D.C. amplifier 43 together with the signal appearing on contact 47. The output signal from the amplifier 43 is applied to and drives a motor 41. The motor 41 drives a piston rod 42 to position the piston 12. In this form of the invention, the piston rod 42 is provided with a pointer 44 which moves along a scale 46 which is calibrated to indicate the ratio of the gas pressure of one of the sources to the gas pressure of the other.

In operation, with a source of gas pressure connected to the chamber 16 and a source of gas pressure connected to the chamber 18 the motor 24 drives the pistons 26 and 28 in the manner described earlier, thereby cyclically changing the pressures in chambers 16 and 18. Also, the motor 24 moves the switch 45 alternately between contacts 47 and 49 through the operation of the cam 25. Depending on the position of the piston 12, the cyclical gas pressure change in the chamber 16 may be greater or less than the cyclical gas pressure change in the chamber 18. For example, with the gas pressure from both sources the same, and with the piston 12 positioned so that the chamber 16 has a greater volume than the chamber 18, changing the volumes of those chambers by moving the pistons 26 and 28 upwardly causes the pressure increase in the chamber 18 to be greater than the pressure increase in the chamber 16. When either chamber 16 or 18 has a greater cyclical pressure change than the other, the diaphragm 35 fluctuates. The crystal 37 responds to fluctuations of the diaphragm 35 and produces A.C. electrical signals representing those fluctuations.

For crystal 37 output signals which have a positive peak when the switch 45 is on contact 47 and a negative peak when the switch 45 is on contact 49, a positive D.C. potential is applied to the amplifier 43. For crystal 37 output signals which have a negative peak when the switch 45 is on contact 47 and a positive peak when the switch 45 is on contact 49, a negative D.C. potential is applied to the amplifier 43. After amplification, the D.C. output signals are applied to the motor 41 which then drives the piston 12 in a direction which depends on the polarity of the input signal to the motor 41. When the motor 41 positions piston 12 so that the cyclical pressure changes on each side of the piston 12 are equal, the motor stops running and the ratio of the gas pressure of the two sources may be read from the scale 46.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for measuring the ratio of the pressure of a first source of gas to the pressure of a second source of gas comprising first and second gas containing means, first conduit means connecting said first source of gas to said first gas containing means, second conduit means connecting said second source to said second gas containing means, means operable with said first gas containing means to cyclically vary the volume of said first gas containing means at a predetermined rate, means operable with said second gas containing means to cyclically vary the volume of said second gas containing means at said predetermined rate, said first and second conduit means being each adapted to maintain the quantities of gas in said first and second gas containing means substantially constant when the volumes of said first and second gas containing means are cyclically varied at said predetermined rate, means responsive to cyclical variations in the gas pressures in said first and second gas containing means which result from cyclical variations in the volumes of said first and second gas containing means to produce a signal representing the difference between the cyclical pressure change in one gas containing means and the cyclical pressure change in the other gas containing means, means adapted to vary the relative volumes of said first and second gas containing means, means coupled to receive the signal from said means responsive to cyclical variations, said means coupled to receive the signal from said means responsive to cyclical variations being operable with said means adapted to vary the relative volumes to vary said volumes so as to cause the cyclical pressure changes in the gas containing means to become equal and thereby cause said means responsive to cyclical variation in the gas pressures in said first and second gas containing means to produce no output signal, and means to indicate the ratio of the quiescent volume of said first gas containing means to said second gas containing means, said ratio representing the ratio of the pressure of one source of gas to the pressure of the other source of gas.

2. Apparatus for measuring the ratio of the pressure of a first source of gas to the pressure of a second source of gas comprising first and second gas containing means, first conduit means connecting said first source of gas to said first gas containing means, second conduit means connecting said second source of gas to said second gas containing means, motor means, first and second pistons driven by said motor and respectively operable with said first and second gas containing means to cyclically vary at a predetermined rate the volumes of said first and second gas containing means, said conduit means being each adapted to maintain the quantities of gas in said first and second gas containing means substantially constant when the volumes of said first and second gas containing means are cyclically changed at said predetermined rate, means responsive to cyclical variations in the gas pressures in said first and second gas containing means which result from cyclical variations in the volumes of said first and second gas containing means to produce a signal representing the difference between the cyclical pressure change in one gas containing means and the cyclical pressure change in the other, means adapted to vary the relative volumes of said first and second gas containing means, means coupled to receive the signal from said means responsive to cyclical variations, said means coupled to receive the signal from said means responsive to cyclical variations being operable with said means adapted to vary the relative volumes to vary said volumes so as to cause the cyclical pressure changes in the gas containing means to become equal and thereby cause said means responsive to cyclical variations in the gas pressures in said first and second gas containing means to produce no output signal, and, means to indicate the ratio of the quiescent volume of said first gas containing means to said second gas containing means, said ratio representing the ratio of the pressure of one source of gas to the pressure of the other source of gas.

3. Apparatus for measuring the ratio of the pressure of a first source of gas to the pressure of a second source of gas comprising gas containing means, a piston positionably contained within said gas containing means, conduit means connecting said first source of gas to said gas containing means on one side of said piston and conduit means connecting said second source of gas to said gas containing means on the other side of said piston, means coupled to said gas containing means on both sides of said piston to cyclically vary at a predetermined rate the volumes on both sides of said piston, said conduit means maintaining the quantities of gas on the opposite sides of the piston substantially constant when the cyclical changes in the volumes on both sides of said piston occur at said predetermined rate, motor means coupled to said piston, means responsive to cyclical pressure changes on both sides of said piston which result from cyclical changes in the volumes on both sides of said piston to produce a signal representing the difference between the cyclical pressure change on one side of said piston and the cyclical pressure change on the other, said signal being applied to said motor means to drive said piston so as to cause the cyclical change in pressure on each side of said piston to become equal and thereby cause said means responsive to cyclical pressure changes to produce no output signal, and means to indicate the ratio of the quiescent volumes on each side of said piston, said ratio being representative of the ratio of the pressure of one source to the pressure of the other source of gas when said cyclical pressure changes are equal.

4. Apparatus for measuring the ratio of the pressure of a first source of gas to the pressure of a second source of gas comprising gas containing means, a piston positionably contained within said gas containing means, conduit means connecting said first source to said gas containing means on one side of said piston and conduit means connecting said second source of gas to said gas containing means on the other side of said piston, drive means, means driven by said drive means and coupled to said gas containing means on both sides of said piston to cyclically vary at a predetermined rate the volumes on both sides of said piston, said conduit means each maintaining the quantities of gas on the opposite sides of the piston substantially constant when cyclical variations in the volumes on both sides of said piston occur at said predetermined rate, means responsive to cyclical pressure changes on both sides of said piston which result from cyclical changes in the volumes on both sides of said piston to produce a signal representing the difference between the cyclical pressure change on one side of the piston and the cyclical pressure change on the other, motor means coupled to receive the signal from said means responsive to pressure changes, said motor means being also coupled to said piston to drive said piston so as to cause the cyclical pressure change on each side of said piston to become equal, and thereby cause said means responsive to cyclical pressure changes to produce no output signal, and means to indicate the ratio of the quiescent volume on one side of the piston to the quiescent volume on the other side of the piston, said ratio being representative of the ratio of the pressure of one source to the pressure of the other.

5. Apparatus for measuring the ratio of the pressure of a first source of gas to the pressure of a second source of gas comprising gas containing means, a first piston positionably contained within said gas containing means, a capillary tube connecting said first source into said gas containing means on one side of said first piston and a capillary tube connecting said second source of gas to said gas containing means on the other side of said first piston, first motor means, a second and third piston each driven in like manner by said first motor and respectively operable with said gas containing means to cyclically vary at a predetermined rate the volumes on both sides of said first piston, each of said capillary tubes maintaining the quantities of gas in the opposite sides of the piston substantially constant when cyclical variations in the volumes on both sides of said first piston occur at said predetermined rate, first and second conduit means, a dynamic pressure differential pickup respectively coupled to said gas containing means on opposite sides of said first piston by first and second conduit means, said pickup comprising a diaphragm whose faces are respectively exposed to the gas on both sides of the piston contained within said gas containing means and piezoelectric crystal responsive to movement of said diaphragm to convert said movement to electrical signals, said pickup producing a signal representing the difference between the cyclical pressure change on one side of said first piston and the cylical pressure change on the other, second motor means coupled to receive the signal from said dynamic pressure differential pickup, said motor means being also coupled to said first piston to position said piston so as to cause the cyclical pressure change on each side of said first piston to become equal and thereby cause said pickup to produce no output signal and means to indicate the ratio of the quiescent volumes on each side of said first piston said ratio being representative of the ratio of the pressure of one source to the pressure of the other.

6. Apparatus for measuring the ratio of the pressure of a first source of gas to the pressure of a second source of gas comprising first and second gas containing means, conduit means connecting said first and second sources of gas respectively to said first and second gas containing means, means operable with said first gas containing means to cyclically vary the volume of said first gas containing means at a predetermined rate, means operable with said second gas containing means to cyclically vary the volume of said second gas containing means at said predetermined rate, each of said conduit means maintaining the quantities of gas in said first and second gas containing means substantially constant when the volumes of said first and second gas containing means are cyclically varied at said predetermined rate, means responsive to cyclical variations in the gas pressures in said first and second gas containing means which result from cyclical variations in the volumes of said first and second gas containing means to produce a signal representing the difference between the cyclical pressure change in one gas containing means and the cyclical pressure change in the other, means adapted to vary the volume of said first gas containing means, means adapted to vary the volume of said second gas containing means, means coupled to receive the signal from said means responsive to cyclical variations, said means coupled to receive the signal from said means responsive to cyclical variations being operable with said means adapted to vary the volume of said first gas containing means and said means adapted to vary the volume of said second gas containing means to vary said volumes so as to cause the cyclical pressure changes in the gas containing means to become equal and thereby cause said means responsive to cyclical variations in the pressures in said first and second gas containing means to produce no output signal, and indicator means operable with said means adapted to vary the volume of said first and second gas containing means to indicate the ratio of the pressure of one source to the pressure of the other, said ratio being represented by the relative volumes of said first and second gas containing means.

References Cited in the file of this patent
UNITED STATES PATENTS

| | | |
|---|---|---|
| 1,107,298 | Haas | Aug. 18, 1914 |
| 2,116,636 | Neuman | May 10, 1938 |
| 2,242,656 | Moore | May 20, 1941 |